United States Patent
Sully

(10) Patent No.: US 6,856,185 B2
(45) Date of Patent: Feb. 15, 2005

(54) SIMPLE RMS TO DC CONVERTER

(75) Inventor: Henry Herbert Sully, Suwanee, GA (US)

(73) Assignee: Arris International, Inc., Suwanee, GA (US)

( * ) Notice: Subject to any disclaimer, the term of this patent is extended or adjusted under 35 U.S.C. 154(b) by 70 days.

(21) Appl. No.: 10/278,688

(22) Filed: Oct. 23, 2002

(65) Prior Publication Data

US 2003/0076698 A1 Apr. 24, 2003

Related U.S. Application Data

(60) Provisional application No. 60/345,363, filed on Oct. 23, 2001.

(51) Int. Cl.[7] ................................................. H02M 5/04
(52) U.S. Cl. ...................... 327/330; 327/540; 327/588; 363/68; 363/125
(58) Field of Search ................................. 327/315, 317, 327/321, 330, 538, 540, 588; 363/52, 61, 67, 68, 81, 84, 86, 88, 125

(56) References Cited

U.S. PATENT DOCUMENTS

| | | | |
|---|---|---|---|
| 4,390,831 A | * | 6/1983 | Byrd et al. .................. 323/240 |
| 5,371,667 A | * | 12/1994 | Nakao et al. ................ 363/124 |
| 5,930,130 A | * | 7/1999 | Katyl et al. ................... 363/53 |
| 6,348,829 B1 | | 2/2002 | Gilbert |
| 6,437,994 B1 | * | 8/2002 | Blom et al. ................... 363/16 |

* cited by examiner

*Primary Examiner*—Timothy P. Callahan
*Assistant Examiner*—Terry L. Englund
(74) *Attorney, Agent, or Firm*—John L. Doughty

(57) ABSTRACT

A full-wave rectifier, two resistors forming a voltage divider across the rectifier outputs and a capacitor in parallel with one of the resistors, provide an output across the capacitor that approximates the RMS equivalent of an input signal to the rectifier. The capacitance value may be selected to attenuate certain AC components without significantly affecting the accuracy of the RMS approximation. The shape of the input-signal-may be rectangular, trapezoidal, sinusoidal, triangular, random, constant DC, or a combination thereof, without affecting conversion accuracy. A DC voltage charge is maintained on the capacitor, which has been charged via the voltage divider, to a proportionally scaled equivalent of the RMS voltage of the input signal, through switched, non-symmetrical charge/discharge paths of the rectifier and the resistors.

9 Claims, 1 Drawing Sheet

SIMPLE RMS TO DC CONVERTER

CROSS REFERENCE TO RELATED APPLICATION

This application claims the benefit of priority under 35 U.S.C. 119(e) to the filing date of Sully, U.S. provisional patent application No. 60/345,363 entitled "Simple RMS to DC Converter", which was filed Oct. 23, 2001, and is incorporated herein by reference.

FIELD OF THE INVENTION

This invention relates, generally, to telephony systems and, more particularly, to the sensing of power supply voltage carried by a coaxial cable in a cable television system used to provide telephony.

BACKGROUND

A coaxial cable in a community antenna television ("CATV") system may be used to provide telephony services in addition to traditional cable television programming. The power supply signal used to power telephony components in such a system is typically generated as a DC signal or an AC sine wave signal at a central office or head end facility. The voltage of the power supply signal is typically about 90 volts. However, as the power supply signal propagates through a CATV system, the waveform may become altered, as the impedance of the various loads that are supplied by this signal can affect the shape of the waveform. Thus, although the power supply signal may be generated as a AC signal having a sinusoidal shape, by the time the signal reaches a particular piece of equipment, such as a VOICE PORT™ device provided by ARRIS™ International, Inc., the sine wave may have mutated into a signal having a shape other than a sinusoid, a triangle wave, for example. In addition, the resulting triangle wave may not be symmetrical, either with respect to the waveform on either side of a vertical axis through the a peak, or with respect to the 0 V horizontal axis (i.e., a DC offset). Thus, the root-mean-square ("RMS") value cannot be predicted by merely measuring the peak-to-peak voltage of the supply signal.

It is desirable to determine the RMS value of the supply voltage at a VOICE PORT™ or other cable telephony device, as these devices often comprise circuitry that is of the constant-power type. In other words, the telephony circuitry constantly attempts to draw a fixed amount of power from a power supply. If the voltage goes up, the current drawn will typically go down. Conversely, if the supply voltage drops, the current drawn by the constant-power circuitry will rise according to P=V×I. If the supply voltage is monitored, protection circuitry can take sensitive, constant-power circuitry out of service while dangerous voltage levels exist. Dangerous voltage can occur as higher than normal voltage levels, but low voltage levels are typically more dangerous because of the high current that is drawn to maintain a constant power level.

Since heating, and damage-causing overheating, is directly related to the total amount of current that flows through a circuit, monitoring the RMS voltage of a power supply signal more accurately predicts the total power used by a constant-power device, and its internal circuitry, than does the monitoring of peak-to-peak voltage. To monitor the current draw in cable telephony devices, peak detection circuitry has been used. This provides a measure of the peak voltage of a supply power signal. Peak detection technology is adequate for use as long as the power-supply-signal waveform is known, because circuits can be designed to remove a cable telephony circuit from service when the peak supply voltage drops below a predetermined level. For example, if the maximum RMS current that can be safely drawn by a circuit occurs when the RMS voltage is 56.6 V, then protection circuitry could be set to operate when the peak voltage of a power supply signal falls below 80 V (80 V×0.707=56.56 V) for a supply having a sinusoidal waveform. However, for a triangle shaped waveform having a duty cycle of D=1, the RMS voltage would only be 46.2 V for a peak voltage of 80 V. Therefore, although the supply voltage would be acceptable based on the 80 V measured peak voltage, damage could occur because the constant-power telephony circuit would draw higher current to compensate for the lower RMS voltage.

Thus, there is a need for a device that can accurately measure the RMS voltage of a signal regardless of the waveform shape.

SUMMARY

It is an object to provide a simple RMS to DC converter that can provide a scaled DC output signal that is proportional to the RMS voltage of an input signal regardless of the input signal's waveform shape.

It is still a further object to provide a RMS to DC converter that can be optimized for operation at different frequencies.

Generally described, a simple RMS to DC converter for providing a scaled DC output proportional to an input signal regardless of the input signal waveform is provided comprising a rectifying means for converting an input waveform to a DC signal, the rectifier having first and second output nodes. A first resistive element having a first node connected to the second output node and a second resistive element having a first node connected to a second node of the first resistive element and a second node connected to the first output node of the rectifier are used. The first and second resistive elements are connected in series to form a voltage divider across the output nodes of the rectifying means and a capacitive element is connected in parallel with the first resistive element, the output DC signal being produced across the capacitive element/first resistive element parallel combination.

DETAILED DESCRIPTION

Figure 1:
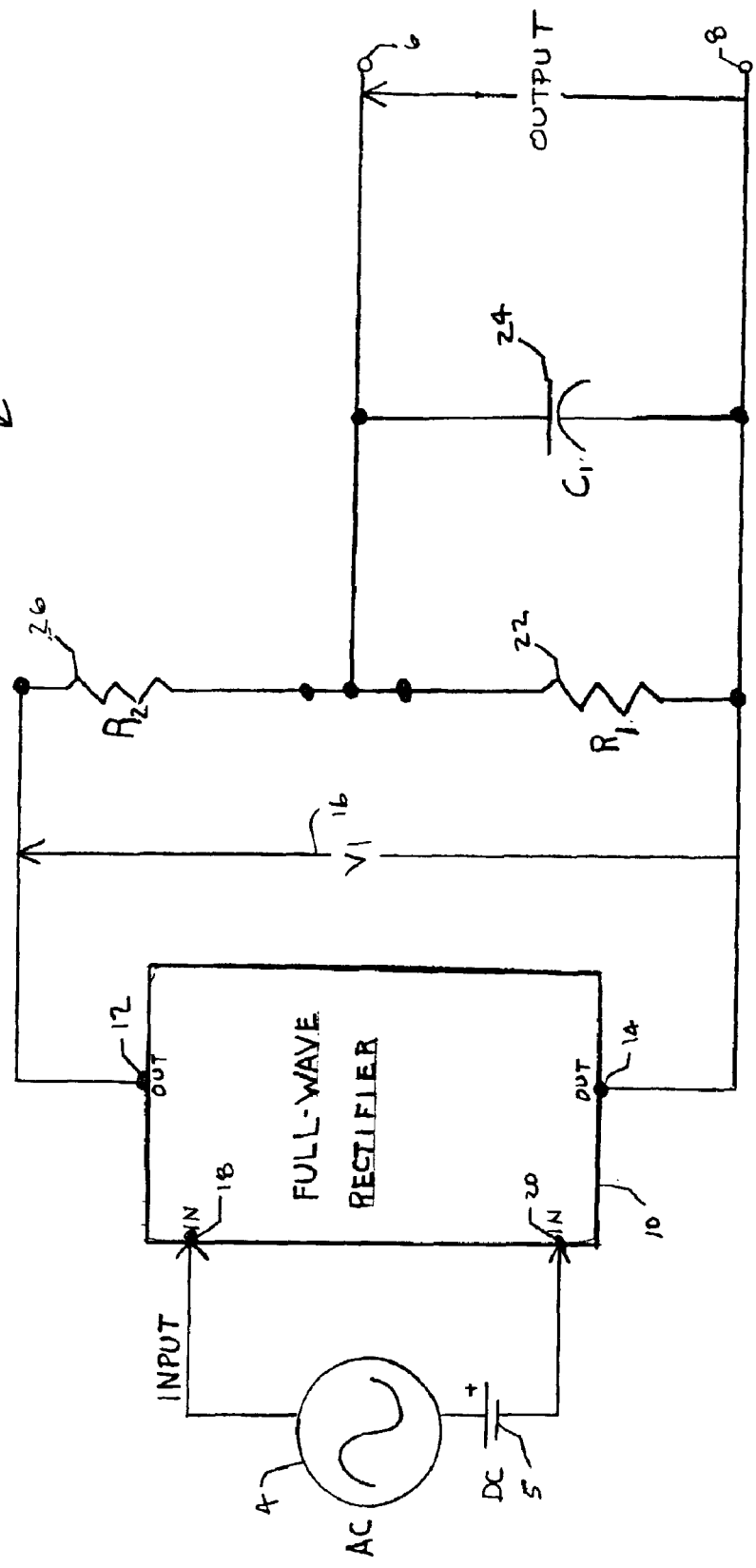
FIG. 1 illustrates a schematic diagram of a simple RMS to DC converter.

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no specific conductor, integrated circuit, rectifier style, connector, enclosure, power supply, circuit board arrangement, component rating or fuse rating, for example, is required to be used in the practicing of the present invention. Indeed, selection of such parts and components would be within the routine functions of a designer skilled in the art.

Turning now to the figures, FIG. 1 illustrates a schematic diagram for a circuit 2 that can be used to determine the RMS equivalent of an input signal, which may include waveform 4 as well as a DC component from DC supply source 5. Circuit 2 provides a DC output signal between terminals 6 and 8 having a magnitude that is proportional to the RMS equivalent of the input voltage at nodes 18 and 20. It will be appreciated that although in the remainder of this description, input signal 4 may be solely referred to as the input signal at nodes 18 and 20 for simplicity, the input signal may also include a DC signal from source 5. It will further be appreciated that source 4 and source 5 are shown schematically as an AC source and a DC source, but that they are illustrated to show that the supply signal in a typical CATV system can take on any waveform, including AC, DC, or a combination thereof.

A rectifier 10 receives the input waveform 4 and converts the signal to a DC signal, which is produced at output nodes 12 and 14. Rectifier 10 may be a full wave rectifier, the operation of which is known to those skilled in the art. Therefore, only a brief description of the operation of rectifier 10 will be described. For an AC input signal where rectifier 10 is a full wave rectifier, the rectified output 16 between nodes 12 and 14 will typically be similar to the input signal waveform 4 where the input signal is greater than zero, and will be the inverse of the input signal waveform when the input signal is less than zero. For example, if input waveform 4 is a sine wave, when the input signal at node 18 is positive with respect to node 20, the signal passes through rectifier 10 unchanged. When the input signal at node 18 with respect to node 20 is negative, the output signal at nodes 12 and 14 is the inverse of the input signal. Thus, the resulting waveform of output signal 16 would be a successive series of positive ripples with each ripple having the shape of half of a sinusoidal cycle. This output signal may be represented by $f(\omega t) = |\sin \omega t|$.

To smooth the ripples and provide a constant output signal level proportional to the input signal level, a capacitor is used with a voltage divider, which provides the appropriate scaling and proportionality of the output signal between nodes 6 and 8 to the RMS value of the input waveform 4. In previous attempts that use conventional peak reading functionality to sense when supply voltage is outside of an acceptable range, resistor 22 in parallel with capacitor 24 have been used. As the voltage of input signal 4 rises, capacitor 24 charges. When the peak voltage of signal 4 has been reached and starts to decline, the charge stored in capacitor 24 gradually discharges through resistor 22. Although the values used for resistor 22 and capacitor 24 may be chosen to provide a particular time constant that is optimized for a particular application, the sensed voltage between output nodes 6 and 8 would still be only a peak measurement. By adding resistor 26 to form, in conjunction with resistor 22, a voltage divider between rectifier nodes 12 and 14, and carefully selecting the values of the resistors, the voltage between nodes 6 and 8 is proportional to the RMS voltage of the input signal voltage between nodes 18 and 20, and thus accurately represents the input voltage level. The proportionality is fixed based on the ratio of the resistance of resistor 22 to resistor 26. The value of capacitor 24 does not affect the proportionality, but may be varied to optimize circuit 2 for use at different frequencies.

After a period of time, or a certain number of AC cycles, based on the RC time constant of the circuit, the average output voltage developed across the capacitive element 24 will reach a steady state condition. Once this condition has been reached, and the instantaneous voltage 16 is equal to the RMS value of the applied input signal voltage 4, no current will flow into or out of capacitive element 24. At this point, the voltage across capacitive element 24 will be equal to the RMS voltage of the input signal voltage 4, scaled by the voltage divider ratio of the resistances of resistive elements 22 to 26. It will be appreciated that this condition is readily observed when the input signal 4 is a DC voltage. In the case of DC, the RMS voltage is always equal to the value of the DC voltage. For waveforms that are not DC or perfectly rectangular, the voltage V1 16 will rise and fall above and below the RMS value of the input signal 4. The average voltage on the capacitive element 24 equals the scaled RMS value of the input voltage 4 when the integrated, or average, charging current of the capacitive element 24 equals the integrated discharging current during the periods of time when the input voltage is higher or lower than the RMS value.

It will be appreciated that the integrated absolute values of the input voltage waveform 4 above and below the RMS value are typically not symmetrical about the RMS value for a CATV system. Accordingly, in such a scenario, a non-symmetrical charge and discharge impedance can be used to balance the average charge and discharge currents for most waveforms of input signal 4. Full-wave rectifier 10 blocks current flow through resistive element 26 when the absolute value of input voltage 4 is less than the voltage across capacitive element 24. Accordingly, current flows out of capacitive element 24 through resistive element 22. When the absolute value of input voltage 4 is greater than the voltage across capacitive element 24, current flows into capacitive element 24 through the network of resistive elements 22 and 26.

Thus, these non-symmetrical charge and discharge impedances can balance the charge and discharge conditions by selecting the resistance ratio of resistive element 22 to resistive element 26. It has been discovered that a particular ratio of resistances will result in circuit 2 accurately approximating the RMS voltage of the input signal 4 for most any type of waveform, including random noise. This ratio exists when the resistance of resistive element 22 is approximately 2.137255 times larger than the resistance of resistive element of 26, thereby resulting in the output of circuit 2 being a scaled output voltage between nodes 6 and 8 that is proportional to the RMS voltage of signal 4. When the resistance ratio of resistive elements 22 to 26 is 2.137255, the output between nodes 6 and 8 is 0.68125 of the RMS voltage of input signal 4.

Accordingly, normalizing the output between nodes 6 and 8 by dividing by 0.68125 results in the voltage of the resultant signal being the RMS equivalent voltage of the input waveform 4. It will be appreciated that circuit 2 may still function to provide an output proportional to the RMS voltage of input signal 4 if the resistive ratio is not exactly 2.137255. However, the ratio of 2.137255 has been found to be the optimum ratio for accurately approximating the RMS voltage of input signal 4, and the greater the difference between the actual ratio and 2.137255, the greater the error in approximating the RMS input voltage.

Within certain limits, circuit 2 operates independently of frequency. There is a tradeoff between the settling time (when the charge on capacitive element 24 reaches steady state) verses the amount of ripple voltage present on the output between nodes 6 and 8. This can be adjusted by setting the RC time constant of capacitive element 24 and the resistance network R1∥R2 to the desired values for a particular application. For example, if the requirement is to sense an input signal 4 whose lowest AC frequency component was 200 Hz with minimal ripple component at 200 Hz, yet reach a steady state condition in less than 0.5 seconds, the −3 dB frequency may be selected to be $1/100^{th}$ of the lowest frequency, or 2 Hz. In this condition, the 200 Hz frequency component will be approximately 43 dB down, or will contribute less than 1% of the total error, yet the circuit will reach steady state in about 400 ms. Of course, frequencies above 200 Hz will contribute even less percentage of error, as their amplitude will continue to decrease at a rate of 20 dB/decade.

It will be appreciated that while the circuit 2 may be implemented using discrete components, such as diodes, resistors and capacitors, the rectifier 10 can also be implemented using semiconductor devices such as transistors. Furthermore, the resistive elements 22 and 26 can be implemented using active or passive semiconductor devices, such as transistors, or photo-resistors, and the capacitive elements can be implemented using reverse bias semiconductor devices. Moreover, the resistive elements may comprise tunable resistors, such a potentiometers or voltage controlled resistors. Such voltage controlled resistors may be multi-component devices that comprise transistors, particularly field effect transistors. In addition, the components of circuit 2 may be implemented on a substrate, which can be used in an integrated circuit. These described fabrication methods and means are only examples of variations of circuit 2, and are not meant to limit the invention.

What is claimed is:

1. A simple RMS to DC converter, for providing a scaled DC output proportional to the RMS value of an input signal waveform, comprising:

a means for rectifying the input signal waveform, the rectifying means having first and second output nodes;

a first resistive element having a first node connected to the second output node;

a second resistive element having a first node connected to a second node of the first resistive element and a second node connected to the first output node of the rectifying means, the first and second resistive elements being connected in series to form a voltage divider across the output nodes of the rectifying means, the resistance of the first resistive element being related to the resistance of the second resistive element by the ratio of about 2.137255; and a capacitive element connected in parallel with the first resistive element, the scaled DC output being developed across the capacitive element.

2. The converter of claim 1 wherein the first resistive element is a resistor.

3. The converter of claim 1 wherein the first resistive element is tunable.

4. The converter of claim 1 wherein the second resistive element is a resistor.

5. The converter of claim 1 wherein the second resistive element is tunable.

6. The converter of claim 1 wherein the capacitive element is a capacitor.

7. The converter of claim 1 wherein the capacitive element is a diode.

8. The converter of claim 1 wherein the rectifier means, the resistive elements and the capacitive element are fabricated on a substrate.

9. The converter of claim 8 wherein the substrate is used in an integrated circuit.

* * * * *